Oct. 22, 1963     C. A. FRANK     3,107,793
MACHINE FOR HANDLING PACKAGES
Filed March 5, 1962     8 Sheets-Sheet 1
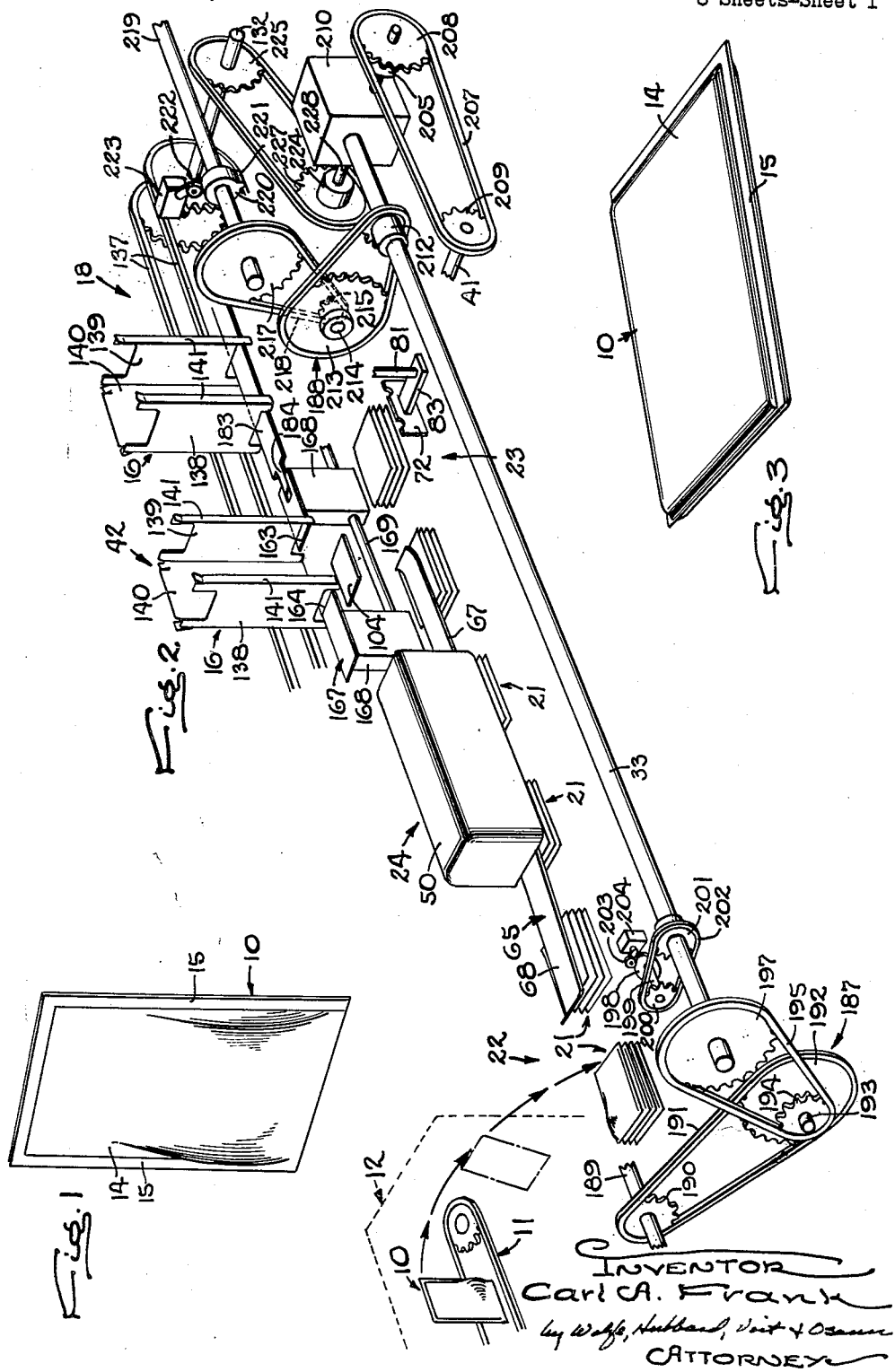

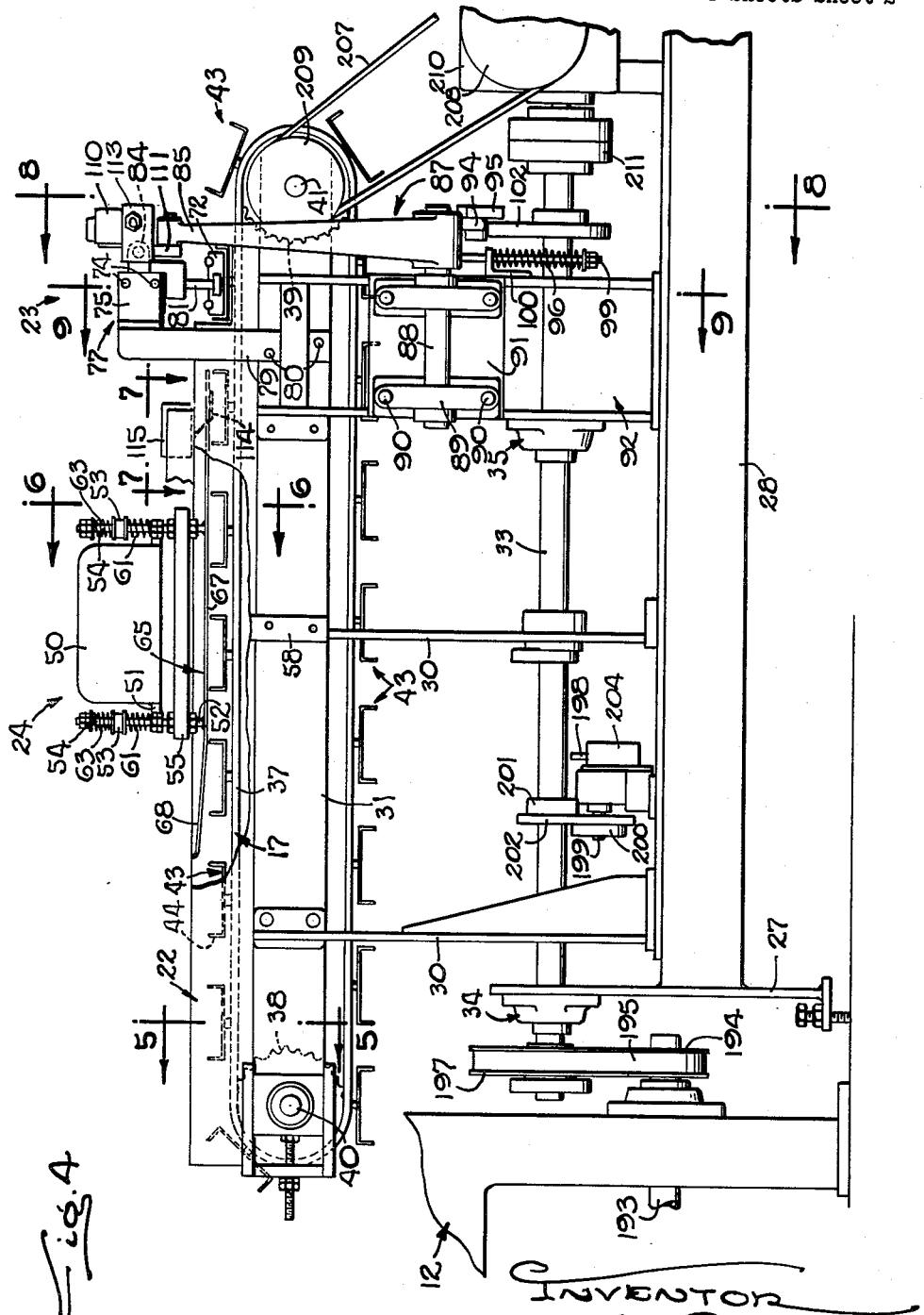

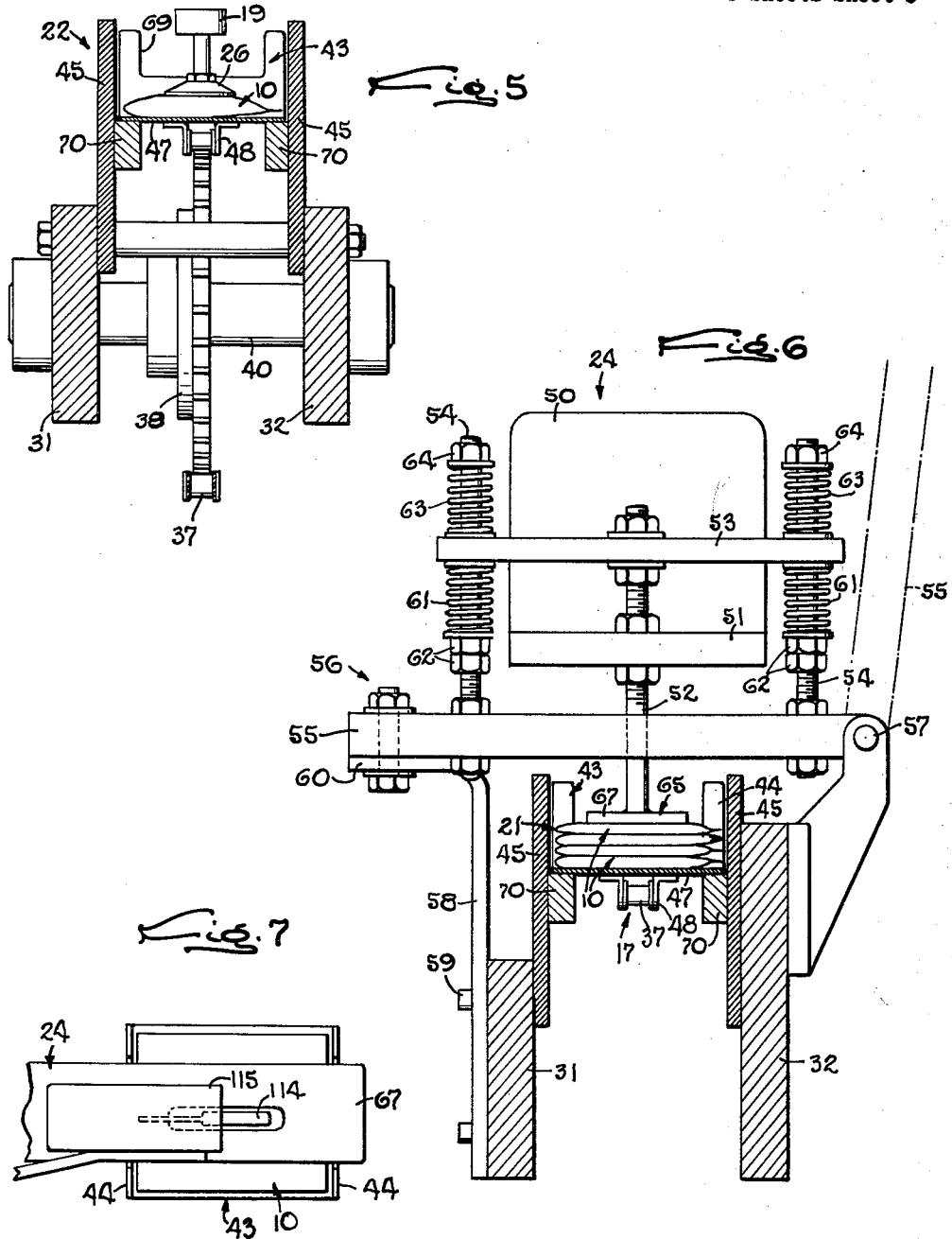

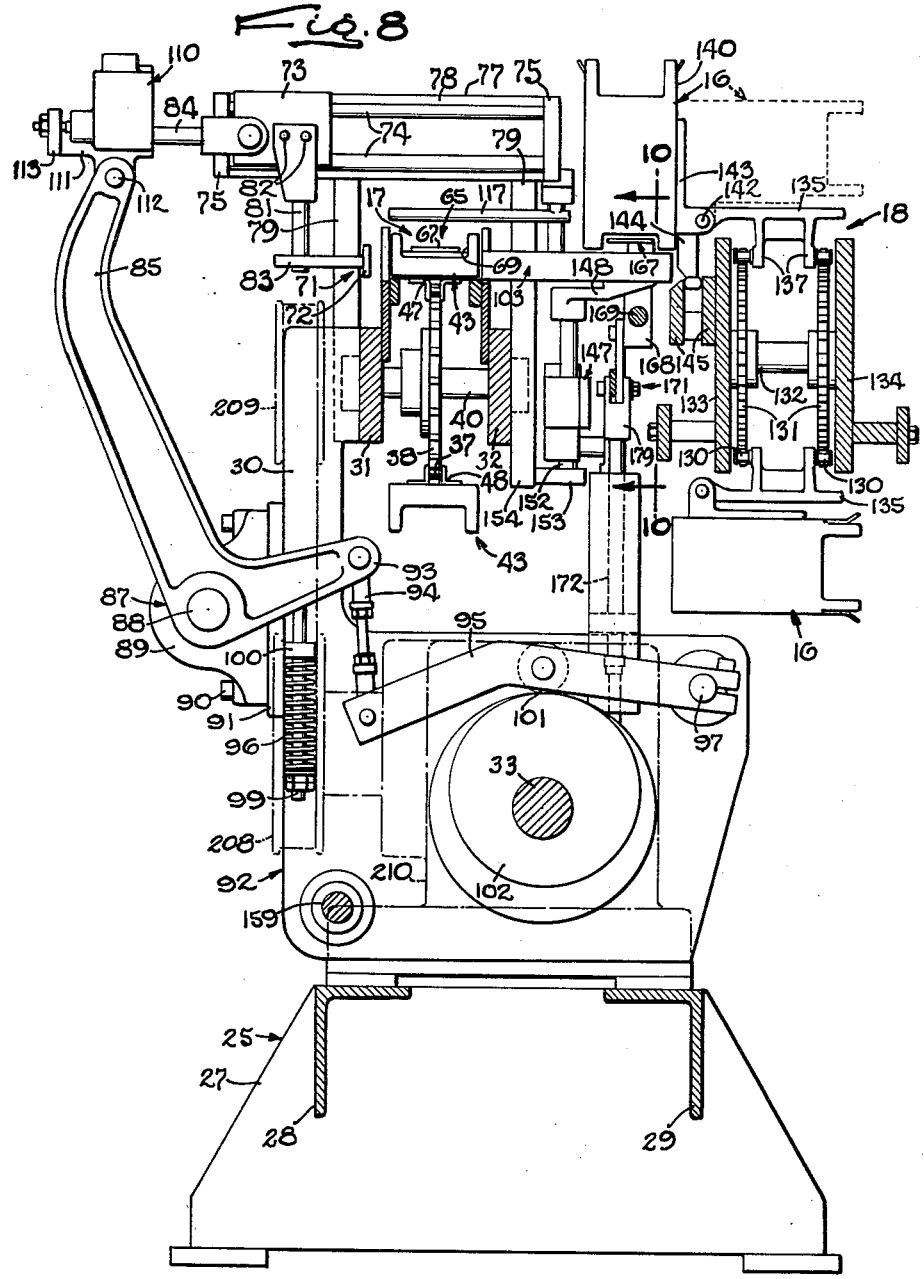

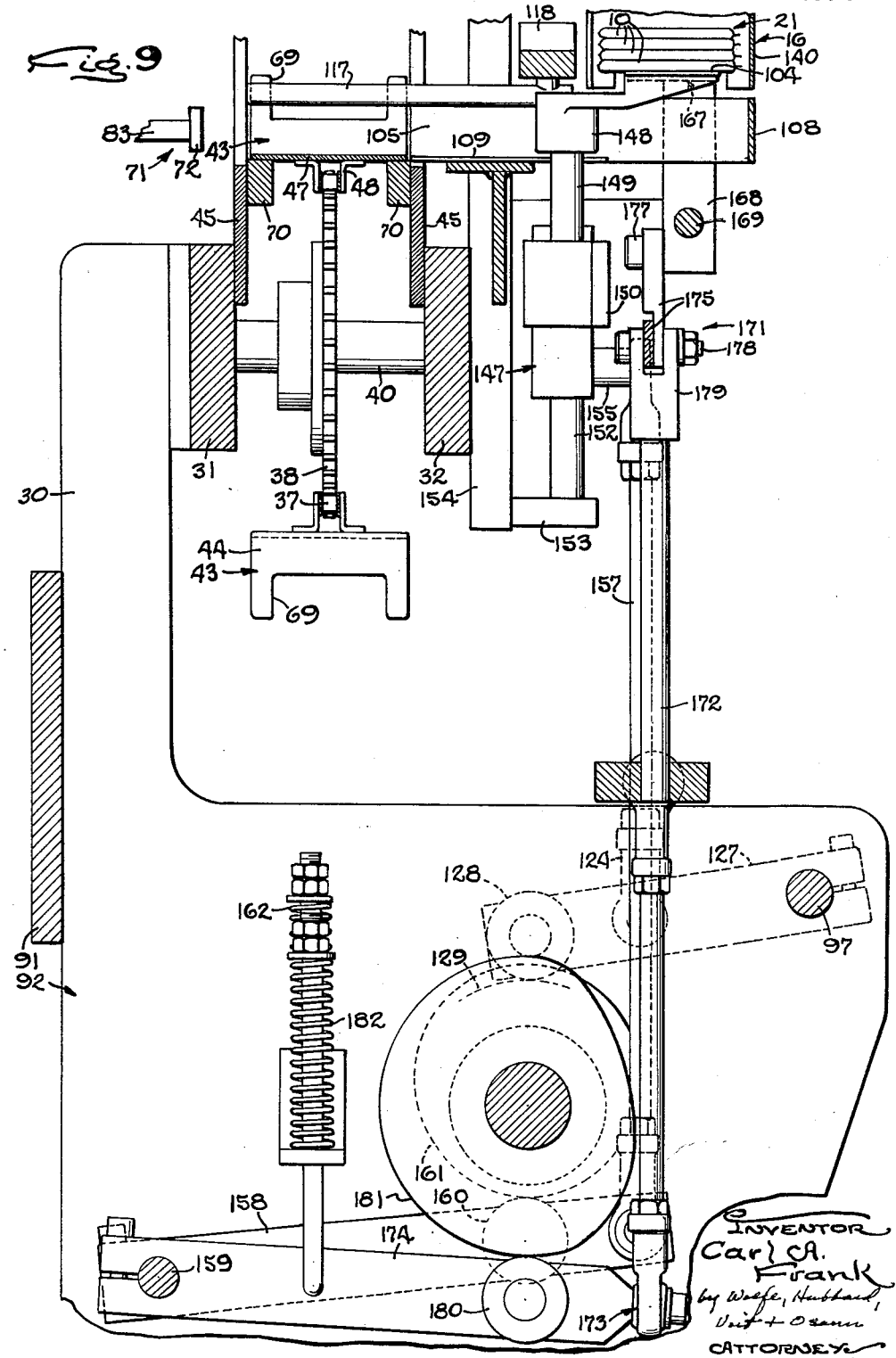

Oct. 22, 1963     C. A. FRANK     3,107,793
MACHINE FOR HANDLING PACKAGES
Filed March 5, 1962     8 Sheets-Sheet 6
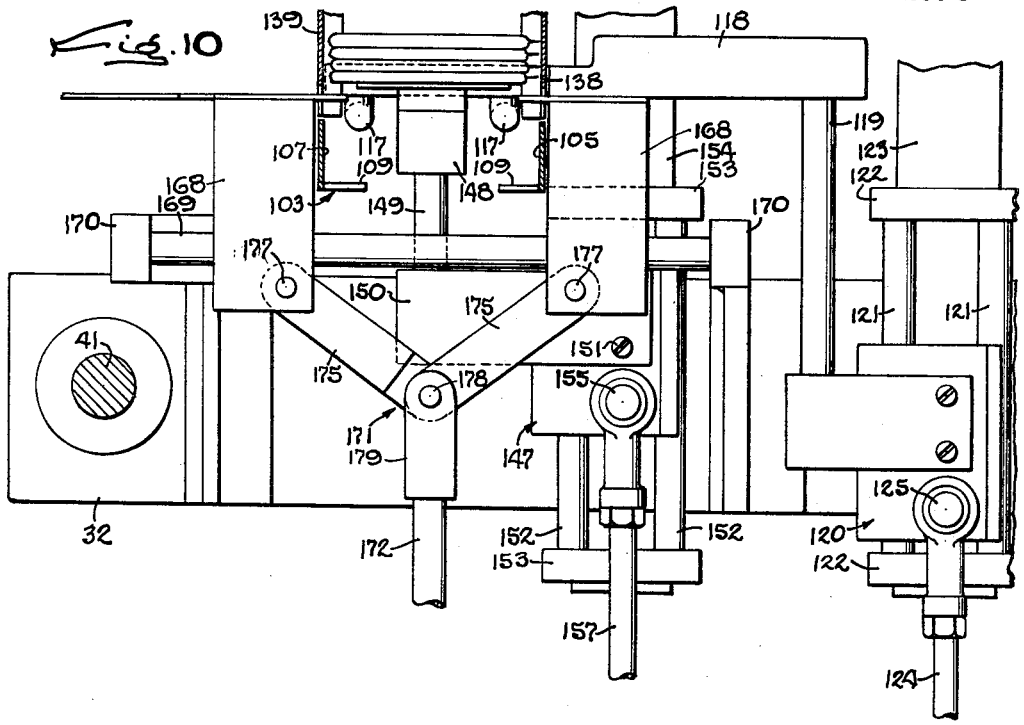
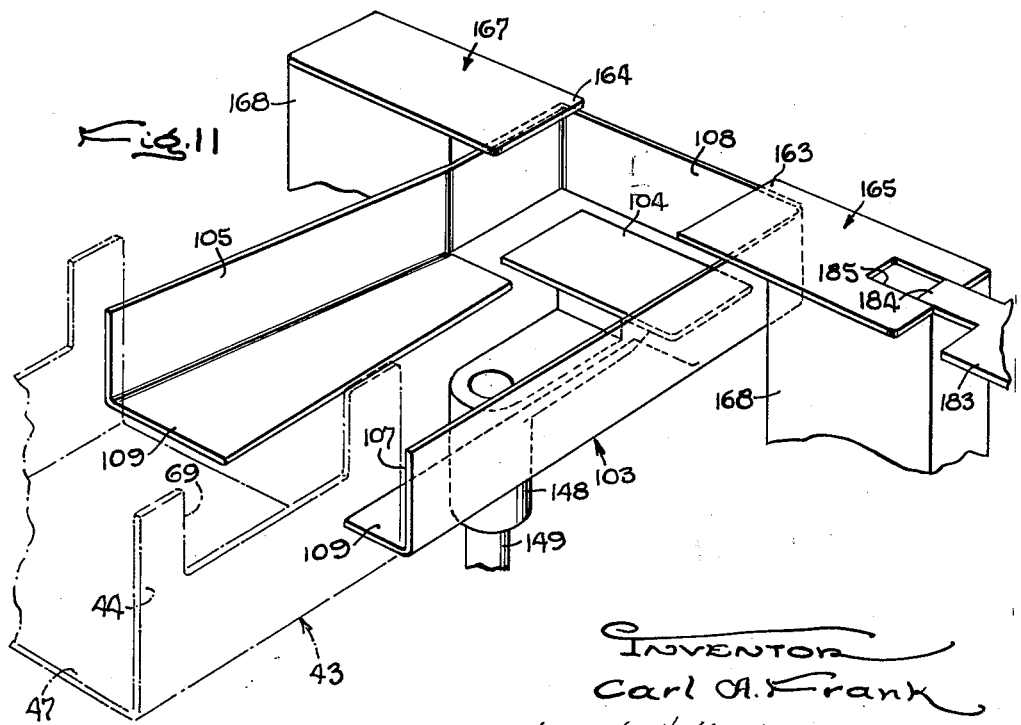
INVENTOR
Carl A. Frank
by Wolfe, Hubbard, Voit & Osann
ATTORNEYS Oct. 22, 1963 C. A. FRANK 3,107,793
MACHINE FOR HANDLING PACKAGES
Filed March 5, 1962 8 Sheets-Sheet 7

INVENTOR
Carl A. Frank
by Wolfe, Hubbard, Voit & Osann
ATTORNEYS

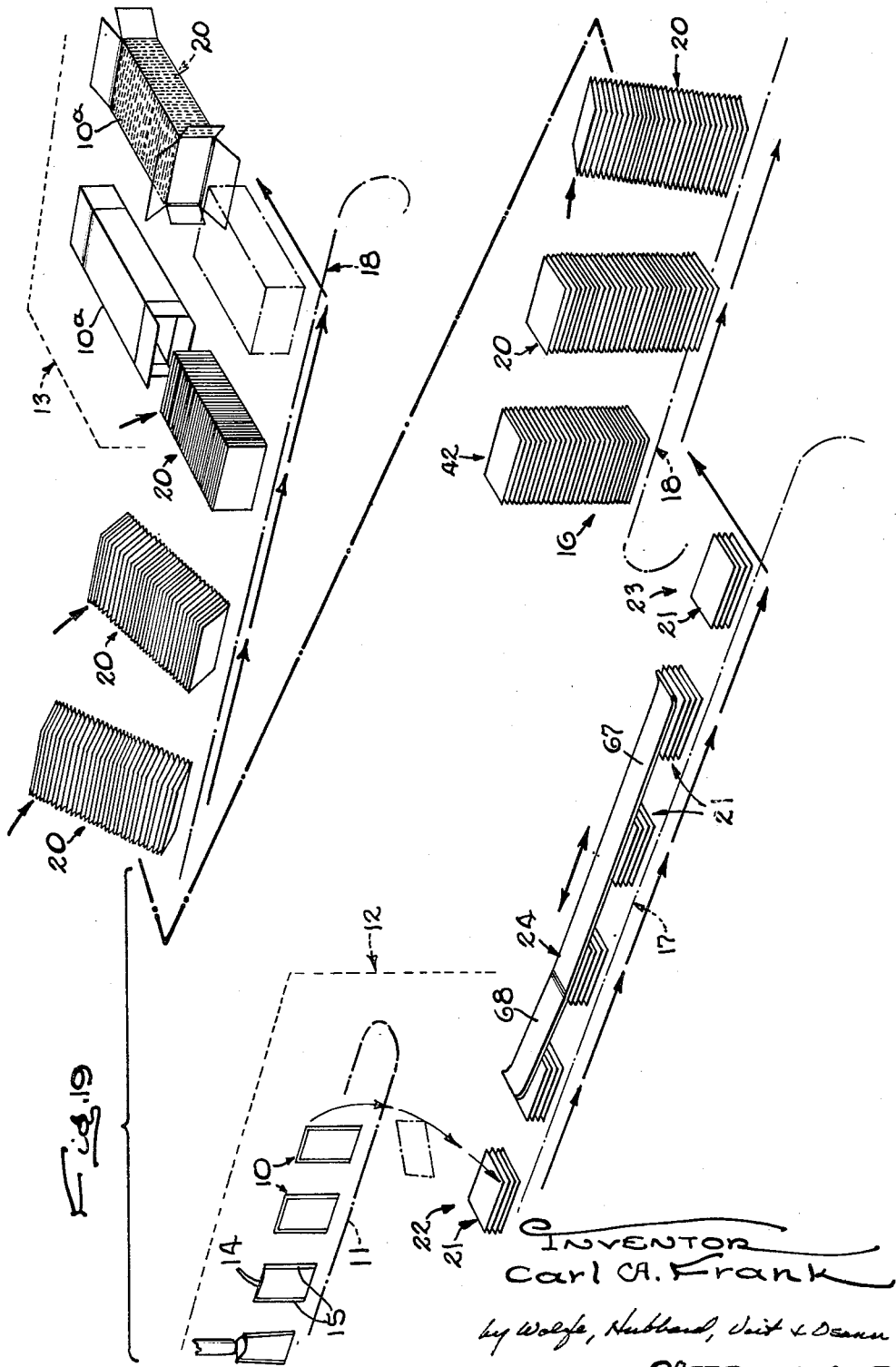

United States Patent Office 3,107,793
Patented Oct. 22, 1963

3,107,793
MACHINE FOR HANDLING PACKAGES
Carl A. Frank, River Vale, N.J., assignor to Bartelt Engineering Company, Inc., Rockford, Ill., a corporation of Delaware
Filed Mar. 5, 1962, Ser. No. 177,385
2 Claims. (Cl. 214—6)

This invention relates to apparatus for handling flat, flexible-walled packages or bags after the latter have been partially filled wtih loose material and closed. More particularly, the invention relates to apparatus for transferring the bags from edge-to-edge upright positions on the carrier of a packaging machine and into stacked side-by-side relation in receivers spaced along a second carrier for transfer to a cartoning machine and insertion in boxes or cartons.

The primary object of the present invention is to pack a relatively large number of bags compactly in a comparatively small carton.

A more detailed object is first to collect the bags on a conveyor in a series of stacks smaller than the stacks to be inserted in the cartons and to advance these stacks past a flattening device positioned along the conveyor and effective to compact and evenly distribute the material in each bag in each stack and then to advance the stacks to a transfer station for incorporation in larger stacks.

Another object is to incorporate the small stacks in larger stacks quickly, easily and in a novel manner so that the bags in the larger stacks are disposed in proper relation for packing in cartons.

A more specific object is to transfer the successive stacks arriving at the transfer station vertically into the receiver dwelling adjacent the transfer station thereby to maintain the bags in vertically stacked side-by-side relation.

A further object is to correlate the operation of the conveyor with the bag carrier, and the operation of the receiver carrier with the conveyor, in a novel manner such that the bags are arranged in small stacks of the desired size on the conveyor and large stacks of the desired size in the receivers automatically as an incident to the driving of the conveyor and the receiver carrier.

The invention also resides in the mechanism for admitting the successive stacks into and holding the same in the receiver dwelling at the receiving station.

Other objects and advantages of the invention will become apparent from the following detailed description taken in connection with the accompanying drawings, in which FIGURE 1 is a perspective view of a bag after the latter has been filled and closed.

FIG. 2 is a schematic perspective view illustrating the steps performed by the apparatus embodying the novel features of the present invention.

FIG. 3 is a perspective view showing the bag after a flattening operation.

FIG. 4 is a fragmentary side elevational view of the novel apparatus.

FIG. 5 is an enlarged fragmentary sectional view taken along the line 5—5 of FIG. 4.

FIG. 6 is an enlarged fragmentary sectional view taken along the line 6—6 of FIG. 4.

FIG. 7 is an enlarged fragmentary sectional view taken along the line 7—7 of FIG. 4.

FIG. 8 is an enlarged section taken along the line 8—8 of FIG. 4.

FIG. 9 is an enlarged fragmentary sectional view taken along the line 9—9 of FIG. 4.

FIG. 10 is an enlarged fragmentary section taken along the line 10—10 of FIG. 8.

FIG. 11 is a fragmentary perspective view of the transfer mechanism constituting a portion of FIG. 8.

FIG. 19 is a schematic perspective view illustrating the steps performed in forming and filling the bags arranging the bags in stacks, and inserting the stacks in cartons.

Figure 12:
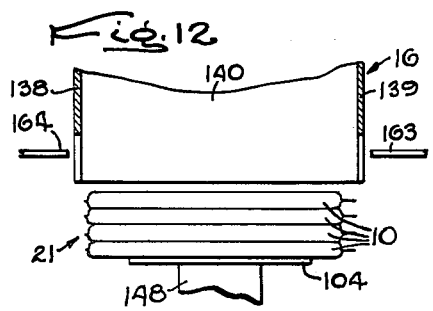
FIG. 12 is an enlarged fragmentary sectional view similar to a portion of FIG. 10 with the parts in different positions and showing the first step in the filling of a receiver.
Figure 13:
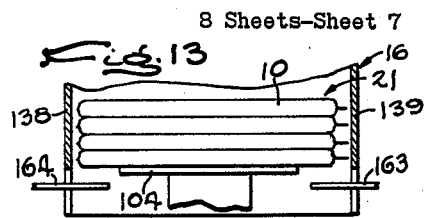
FIG. 13 is a view similar to FIG. 12 with the parts in different positions and showing the next step in filling the receiver.

As shown in the drawings for purposes of illustration, the invention is embodied in a machine for packaging material in a flat, envelope-type bag 10, transferring the bags from edge-to-edge upright positions on a carrier 11 (FIGS. 2 and 19) and into stacked side-by-side relation, and inserting the stacks thus formed into cartons or boxes 10<sup>a</sup>. The bags 10 may be filled with a loose material such as powdered gelatin and a predetermined number, in this case thirty-two, are inserted in each carton. Preferably, the bags are made and filled, the cartons are opened, the bags are inserted in the cartons, and the cartons are closed through the correlated use of a machine 12 (FIGS. 2 and 19) for forming and filling the bags and a machine 13 (FIG. 19) for forming, filling and closing the cartons.

The packaging machine 12 may be of the type shown in Bartelt Patent No. 2,649,674 to which reference is made for details of construction and operation. Generally, a machine of this type forms bags comprising two coextensive side panels 14 disposed in opposed, face-to-face relation and joined together along corresponding margins as by heat seals 15. During forming and filling, the bags are advanced edge to edge along the carrier 11, receiving measured charges of material and finally being closed by sealing of the margins across the upper end. At the end of the carrier, the bags are discharged onto a conveyor 17 (FIGS. 4 and 19) for arrangement in stacks and transfer to the cartoning machine. The latter may be similar to the one disclosed in Harker Patent No. 2,923,112 and includes a second carrier 18 for transferring the stacks step by step along a predetermined path through a plurality of spaced stations, the cartons being positioned to receive the stacks and thereafter closed in a manner well known in the art. The transfer of bags from the bag carrier 11 to the conveyor 17 may be accomplished by a suitable loading mechanism which turns the bags from the upright position to a horizontal position and deposits the bags on the conveyor as illustrated schematically in FIG. 2. This loading mechanism may include an arm 19 (FIG. 5) swingable back and forth between the bag carrier and the conveyor with a suction cup 26 mounted on the free end of the arm to grip and carry the bags to the conveyor.

Due to the flowable nature of the loose material in the bags, this material tends to settle near the bottom of the bag which thus bulges at its lower end as shown in FIG. 1. The present invention contemplates the provision of novel apparatus for packing a relatively large number of bags compactly in a comparatively small carton. For this purpose, the bags first are collected on the conveyor 17 in a series of stacks 21 smaller than the stacks 20 to be inserted in the cartons and are advanced along a predetermined path past a flattening device 24 positioned along the conveyor and effective to compact and evenly distribute the material in each bag in each stack. After being flattened, the stacks 21 are collected in the larger stacks 20 for insertion in cartons.

In the present instance, each small stack comprises four bags and is formed at a loading station 22 on the conveyor 17 adjacent the discharge end of the bag carrier. At the other end of the conveyor is a transfer station 23 and a novel transfer device operable to move the stacks 21 one at a time into a receiver 16 on the carrier 18 until the desired number of bags have been collected in one receiver, at which time the carrier 18 is advanced one step toward the cartoner to bring an empty receiver into position to receive bags at the transfer station.

Preferably, the various elements of the apparatus are mounted on an elongated horizontal frame 25 including legs 27 (FIGS. 4 and 8) disposed at opposite ends of the apparatus and connected by horizontal angle bars 28 and 29. A plurality of posts 30 spaced along and upstanding from the angle bars are bolted adjacent their upper ends to elongated horizontal rails 31 and 32 which are disposed on opposite sides of the conveyor 17 and extend along substantially the entire length of the latter. A horizontal camshaft 33 journaled on the frame in spaced bearings 34 and 35 and generally paralleling the path of the packages is driven intermittently to operate the various mechanisms for handling the packages.

In the present instance, the conveyor 17 is formed by an endless chain 37 running around horizontally spaced sprocket wheels 38 and 39 keyed to shafts 40 and 41 (FIGS. 4, 8 and 9) journaled on the rails 31 and 32, the upper horizontal run of the chain 37 defining the package path and extending from a point adjacent the discharge end of the carrier 11 to the transfer station 23 which is close to the receiving station 42 of the cartoning machine. Preferably, a plurality of holders 43 are secured to the chain in evenly spaced relation to receive the bags from the carrier 11 and maintain the bags in stacks as the latter are moved along the conveyor 17.

As shown in FIGS. 5, 6 and 9, these holders are in the form of U-shaped castings which open upwardly when on the upper run of the chain thereby forming pockets into which the bags are deposited at the loading station 22. The pockets are somewhat longer than the bags (see FIG. 7) to admit the latter between the end walls 44 of the holders, and the sides of the holders are open to facilitate removal of the bags at the transfer station, as will appear later. Between the loading station and the transfer station, the stacks are held against sliding out of the holders by retaining plates 45 (FIGS. 6 and 9) extending along opposite sides of the upper run of the chain and bolted or welded to the rails 31 and 32 closely adjacent the open sides of the holders. The latter are secured to the chain by means of a pair of brackets 48 having horizontal legs welded to the bottom 47 of the holder and vertical legs secured to opposite sides of the chain.

The flattener 24 preferably includes an oscillating motor 50 of any conventional construction formed with flanges 51 projecting outwardly from opposite ends of the motor housing and secured to upright rods 52 (FIG. 6) which extend above and below the flanges. Mounted on the upper end of each rod is a cross bar 53 extending laterally beyond each side of the housing and slidably receiving an upright stud 54 at each end. The studs are bolted at their lower ends to a base 55 hinged on one side at 57 on the rail 32 and extending across the conveyor, the other side of the base resting on a post 58 (FIGS. 4 and 6) screwed at 59 to the rail 31. The base is releasably secured by a bolt 56 to a flange 60 on the post 58. Mounted in this manner, the flattener may be swung to an out-of-the-way position partially shown in phantom in FIG. 6. Encircling the studs 54 below the cross bars 53 are helical compression springs 61 which act between the cross bars and nuts 62 threaded on the lower end portions of the studs to support the motor above the conveyor. Similar compression springs 63 on the studs above the cross bars and acting between the cross bars and nuts 64 on the upper end portions of the studs urge the motor downwardly.

To transmit the vibration of the motor to the bags, an elongated, generally horizontal bar 65 is secured to the lower ends of the rods 52 and extends along the conveyor 17 above the bags. The horizontal portion 67 (FIGS. 2 and 4) of the bar is spaced above the conveyor a distance approximately equal to the desired height of the stacks and, to guide the stacks under the bar for compacting, the leading end portion 88 of the bar is inclined upwardly away from the conveyor. The side walls 44 of the holders are cut away to form notches 69 through which the bar 65 passes thus insuring that the bar engages the top bag of each stack. It will be observed that the spring mounting of the vibrator permits the latter to yield as each stack begins to move under the bar while maintaining pressure on the bar so that the latter and the conveyor cooperate to squeeze and flatten the stacks. To prevent sagging of the chain, guide bars 70 (FIGS. 5, 6 and 9) bolted to the inner sides of the retaining plates 45 extend along the path of the holders so that the latter slide on top of the bars 70 and are braced thereby against downward deflection under the pressure exerted by the flattener.

After passing the vibrator, each flattened and compacted stack 21 is advanced to the transfer station 23 for incorporation in a large stack 20 in the receiver 16 dwelling at the receiving station 42. The stack in the holder 43 dwelling at the transfer station is inserted in the receiver by the transfer mechanism which herein includes a pusher 71 movable back and forth across the conveyor 17 to engage each successive stack and shift the same laterally off the conveyor. As shown most clearly in FIG. 8, the pusher may include a block 72 shorter than the spacing of the end walls 44 of the holders and supported above the level of the bottoms 47 of the holders in alinement with the holder dwelling at the transfer station. Supporting the pusher block is a slide 73 (FIG. 8) journaled for sliding horizontally along parallel rods 74 extending transversely of the conveyor above the transfer station and supported at opposite ends by the two end plates 75 (FIGS. 4 and 8) of a generally U-shaped frame 77, the end plates being disposed on opposite sides of the conveyor and connected by a cross piece 78. The frame is mounted above the conveyor on vertical posts 79 bolted at 80 (FIG. 4) to the rails 31 and 32. Securing the pusher block to the slide for movement in unison therewith is a depending rod 81 bolted at 82 to the slide and carrying at its lower end a horizontal arm 83 extending toward the conveyor but terminating short of the latter when the slide is in the retracted position (FIG. 8). The pusher block is mounted on the end of the arm 83 adjacent the conveyor.

In order to advance the pusher across the conveyor as the latter dwells with a holder positioned at the transfer station, the slide 73 is moved forward along the rods 74 by the camshaft 33. For this purpose, a link 84 is pivotally connected at one end to the slide and at the other end to the upper end of an upright leg 85 of a bell crank 87 (see FIG. 8). The latter is fulcrumed on a shaft 88 (FIGS. 4 and 8) journaled on the frame in bearings 89 to turn about an axis palalleling the package path, the bearings 89 being bolted at 90 to a plate 91 mounted between two of the posts 30. The shorter leg 93 of the bell crank extends inwardly toward the camshaft and is connected through linkage 94 to the free end of a lever 95 lying across the top of the camshaft. As shown in FIG. 8, the lever is pivoted adjacent its right-hand end on a pin 97 projecting from the wall of a housing 92 supported on the bars 28 and 29, and the left-hand end is urged downwardly by a coiled compression spring 96 (FIG. 4) encircling a rod 99 secured to the lever and slidably received in a bracket 100 on the housing 91. Journaled on the lever intermediate the ends of the latter is a roller follower 101 which rides on an eccentric cam 102 fast on the camshaft. The cam and the spring cooperate to raise and lower the follower 101 to rock the lever about the pin 97 and, through the bell crank and links 84 and 94, move the slide and pusher forward and back.

On its forward stroke, the pusher passes between the walls 44 of the holder dwelling at the transfer station, engages the terminal stack and pushes it out of the holder, along a guide trough 103 and onto a platform 104 disposed on the right-hand side of the conveyor. Herein, the trough 103 for guiding the stacks onto the platform 104 is formed by side walls 105 and 107 (FIG. 11) spaced apart a distance slightly greater than the spacing of the holder walls 44 and joined together by a rear wall 108 beyond the platform. Turned inwardly from the portions of the side walls adjacent the forward end of the trough are two horizontal flanges 109 which terminate short of each other to form the bottom of the trough. The free edges of the flanges are spaced apart a distance less than the corresponding dimension of the packages to support the latter for sliding thereon. Each flange also terminates short of the rear wall 108 thereby leaving an opening at the end of the trough, the platform normally being positioned in this opening level with or slightly below the flanges 109. The length of the forward stroke of the pusher is such that each stack is slid onto the platform and close to the rear wall.

As a safety measure for preventing damage to the machine if the bags become jammed at the transfer station, a releasable connection may be provided between the link 84 (FIG. 8) and the upper end of the bell crank 87. Herein, a switch housing 110 slidably mounted on the link is carried by a bar 111 and the latter is fulcrumed at 112 on the bell crank. The housing 110 normally is coupled to the link by a yieldable detent (not shown) which releases the housing 110 if abnormal resistance is encountered by the pusher. In such a case, the housing slides along the rod and away from a lug 113 rigid with the rod so that the switch is opened to de-activate the machine.

To insure that each stack inserted in a carton contains the requisite number of bags, a flexible feeler 114 (FIGS. 4 and 7) may be suspended at a predetermined height above the conveyor adjacent the trailing end of the flattener so that a short stack passes under the feeler without contacting the latter. Herein, this feeler constitutes the actuator for a switch 115 which may be disposed in the machine circuit, the switch normally being open, and closing to permit the initiation of a further step only when a full stack is in the holder as indicated by the feeler.

Preferably, a pair of parallel hold-down bars 117 are mounted above the trough 103 to extend along the path of the stacks between the conveyor 17 and the platform 104 and press the stacks downwardly as the latter slide along the trough thereby providing positive control of the stacks during transfer. These rods are carried on a horizontal arm 118 extending transversely of the trough and are spaced apart a distance less than the length of the packages. The arm 118 is mounted on the upper end of an upright rod 119 (FIG. 10) carried on a vertically movable slide 120 journaled on guide rods 121 supported between spaced brackets 122 on a post 123 secured to the rail 32. A link 124 fulcrumed on a pin 125 projecting from the slide extends into the housing 92 where the lower end of the link is pivotally secured to a lever 127. The latter is fulcrumed on the pin 97 in the housing 92 and carries at one end a follower 128 riding on a cam 129 on the camshaft 33. As the lever 127 is rocked up and down by the cam and a spring (not shown), the hold-down bars first are moved into engagement with the stack being slid out of the holder and then are raised as another holder moves into position at the transfer station.

In accordance with another aspect of the invention, the small vertical stacks 21 of the packages transferred onto the platform 104 from the conveyor 17 are transferred in a novel manner and arranged quickly and easily in the larger stacks 20 comprising thirty-two packages vertically stacked side by side in proper relation for packing in the cartons. For this purpose, the platform transfers the stacks vertically into the receiver 16 dwelling at the transfer station and means is provided for admitting each stack into the receiver and then holding the stack therein as another stack is loaded on the platform at the transfer station.

In the present instance, the receiving station 42 of the carrier 18 is located above the platform 104 and the latter lifts the successive stacks into the receivers through the lower open ends of the latter. The carrier 18 for presenting the receivers successively to the receiving station may be formed by a pair of endless chains 130 disposed in spaced vertical planes and running around the sprocket wheels 131 keyed to shafts 132 journaled in spaced horizontal rails 133 and 134 disposed along opposite sides of the carrier 18 (see FIG. 8). The receivers 16 are carried by platforms 135 evenly spaced along the chains and each having two legs 137 extending in between the chains and suitably secured thereto so that the platforms are disposed above the chains along the upper runs of the latter.

Herein, the receivers 16 comprise buckets formed by opposed parallel side walls 138 and 139 joined across the rear by a wall 140. The upper and lower ends of each bucket, which are larger than the sides of the package, are left open and the remaining side is partially closed by flanges 141 (FIG. 2) turned toward each other from the free edge of each side wall. Preferably, the buckets are pivotally mounted on the platforms as shown in FIG. 8 by means of trunnions 142 on the edge of the platforms 135 journaled in holes in brackets 143 welded to the rear wall of each bucket. Mounted in this manner, the buckets are tiltable about the fulcrum defined by the trunnions between a reclining position in which the rear wall 140 lies parallel to the platform 135 as shown in phantom in FIG. 8 and an upright position, shown in full in FIG. 8, in which the buckets are offset to one side of the platforms with the lower open ends opening downwardly toward the elevator platform. To control the angular position of the buckets, a finger 144 fast on each bracket 143 and paralleling the rear wall 140 extends in between and bears against two parallel plates 145 secured to the rail 133. These plates are vertically disposed adjacent the receiving station to hold the buckets upright, and may be twisted through a ninety-degree turn between the receiving station and the loading station (not shown) of the cartoner thereby to tilt the buckets into reclining positions for discharge of the stacks 20 through the upper ends of the buckets. The latter are carried back to the receiving station in the reclining position and are tilted into the upright position as they approach the receiving station.

To lift successive stacks into the bucket dwelling at the receiving station, the elevator platform 104 is raised and lowered by the camshaft 33 whereby the movements of the platform are correlated with the movements of the pusher 71. Herein, the platform is supported on a carriage 147 by a Z-shaped arm 148 (see FIG. 11) supported at one end on a vertical rod 149 extending between one leg of the arm 148 and a bracket 150 screwed at 151 to the carriage (see FIG. 10). Accordingly, the platform is offset to one side of the carriage and is alined with the opening in the bottom of the trough. The carriage 147 is journaled for up and down sliding on two parallel rods 152 (FIG. 10) fastened between plates 153 supported on one side of the post 154 fast on the rail 32. Journaled on a pin 155 projecting horizontally from the side of the carriage is a vertical link 157 extending into the housing 92 alongside the camshaft and connected at its lower end to the free end of a generally horizontal lever 158 (FIG. 9) fulcrumed at 159 on the housing on the other side of the camshaft. A roller 160 journaled on the lever 158 rides on a cam 161 on the camshaft and is moved up and down by the cam and a spring 162 (FIG. 9) to rock the lever about the fulcrum 159 and thus move the carriage 147 up and down so that the platform is first raised to a position within the buckets (FIGS. 9 and 10) and then is lowered to a position level with the bottom of the trough. The arm 148 on the upper end of the rod 149 passes between the free edges of the flanges 109 as the platform is raised and lowered.

Herein, the means for admitting and holding stacks in the buckets includes first and second fingers 163 and 164 mounted on opposite sides of the bucket being filled and movable back and forth relative to the side walls 138 and 139 between an inactive position and an active position. In the active position, the fingers extend partially across the lower open end and are spaced apart a distance less than the corresponding dimension of the packages but greater than the width of the platform 104 thereby to abut against the underside of the stacks 21 and support the latter in the bucket as the platform is lowered through the space between the fingers. In the inactive position, the fingers are spaced apart a distance greater than the corresponding dimension of the packages so that the latter pass freely into the bucket.

In the present instance, these fingers 163 and 164 comprise the adjacent edge portions of two plates 165 and 167 forming a part of a track which extends horizontally along the lower open ends of the upright buckets on the carrier 18. As shown most clearly in FIGS. 2 and 11, the plates 165 and 167 are supported in a common plane and on opposite sides of the bucket dwelling at the receiving station and are alined with notches in the lower edges of the side walls 138 and 139 respectively. To support the plates for back and forth edgewise sliding in the plane, each plate is mounted on the upper end of a block 168 journaled for sliding horizontally along a rod 169 disposed below and paralleling the track, the opposite ends of the rod 169 being received and held in spaced plates 170 supported on the rail 32 on opposite sides of the receiving station. Thus, as the blocks slide alternately together and apart, the plates 165 and 167 are moved back and forth between the active position and the inactive position.

The movements of the plates are correlated with the movements of the platform 104 so that the fingers are moved apart as a stack 21 reaches the lower open end of the bucket and then are moved back toward each other before the platform passes below the level of the track. For this purpose, the blocks 168 are connected by means of a toggle joint 171 (FIGS. 8, 9 and 10) to an upright arm 172 extending downwardly into the housing 92 and past the camshaft 33. The lower end of this arm is coupled by a joint 173 to a lever 174 disposed below the camshaft and journaled as one end on the pivot pin 159. The toggle joint 171 includes links 175 pivoted at their upper ends on pins 177 projecting from the blocks 168 and pivoted at their lower ends on a pin 178 extending between the legs of a yoke 179 fast on the upper end of the arm 172. A roller 180 journaled on the lever intermediate the ends of the latter rides on a cam 181 on the camshaft and the lever is urged upwardly by a spring 182 (FIG. 9). Thus, the lever is rocked up and down and, through the toggle joint 171, moves the fingers in and out in timed relation with the movements of the platform 104.

To provide a continuous track to hold the bags in the buckets after the latter have passed the receiving station, a third, stationary plate 183 (FIGS. 2, 8 and 11) is mounted level with and overlaps the plate 165 in all positions of the latter. Herein, this plate includes a tongue 184 projecting from the edge of the plate 183 adjacent the plate 165 and slidable in a notch 185 formed in the plate 165. Thus, the tongue 184 maintains the continuity of the track while permitting relative movement between the plates 183 and 165.

Figure 14:
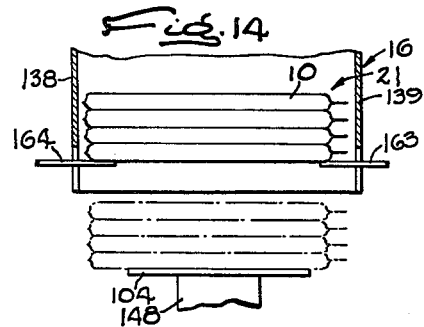
FIG. 14 is a view similar to FIG. 12 showing another step in filling the receiver.
Figure 15:
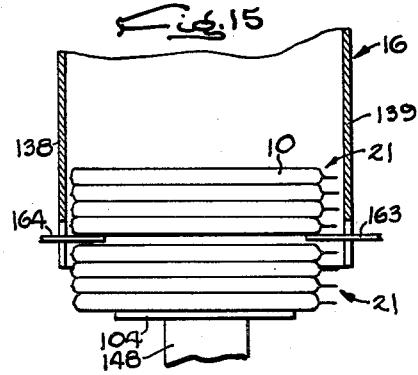
FIG. 15 is a view similar to FIG. 14 showing the next step in filling the receiver.
Figure 16:
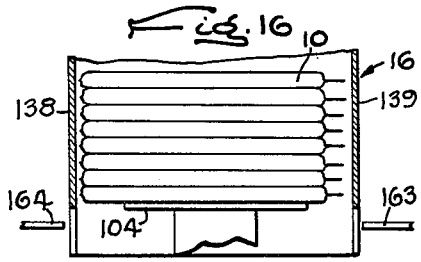
FIG. 16 is a view similar to FIG. 15 showing the next step in filling the receiver.
Figure 17:
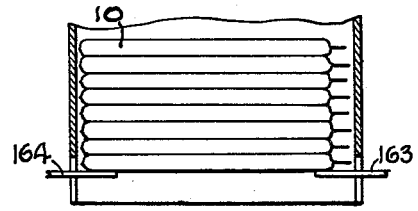
FIG. 17 is a view similar to FIG. 16 showing a further step in filling the receiver.
Figure 18:
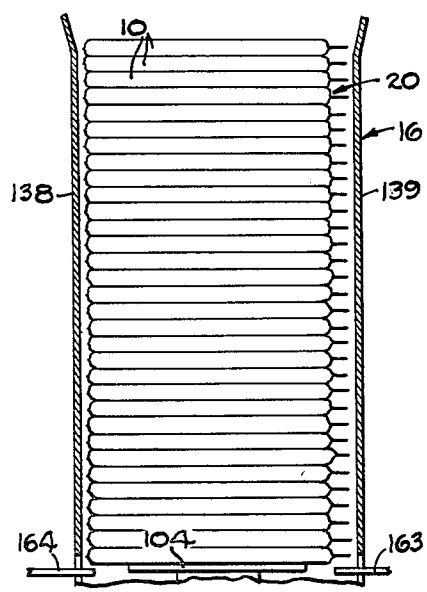
FIG. 18 is a view similar to FIG. 17 showing the final step in filling the receiver.

The successive steps in incorporating a predetermined number of small stacks 21 in a single stack 20 in the bucket dwelling at the receiving station are illustrated in FIGS. 12 through 18. With an empty bucket disposed above the platform the first stack is raised through the lower open end until the lowest bag in the stack is above the level of the track (see FIG. 12), the plate edges 163 and 164 being withdrawn as the elevator 104 is raised into the bucket. Then, the plates are moved into their active positions (FIG. 13) while the lowest bag is above the track, and the platform may be lowered through the opening between the plate edges leaving one stack resting on the plates as shown in FIG. 14. After another stack has been transferred to the platform by the pusher 71, the platform again is raised into the bucket. Just before the top bag on this stack reaches the level of the track (FIG. 15), the plates are withdrawn to the inactive positions (FIG. 16). Consequently, the first stack drops a short distance to rest on the second stack as the platform raises both of these stacks into the bucket. During the return stroke of the platform and just before the lowest package reaches the level of the track, the plates are moved into the active positions (FIG. 17) and now support the two stacks in the bucket. This process continues until the desired number of packages are stacked in the bucket as shown in FIG. 18. Then, the carrier 18 is advanced one step to bring an empty bucket into position at the receiving station.

The invention also contemplates correlating the operation of the conveyor 17 with the bag carrier 11, and the operation of the receiver carrier 18 with the conveyor, in a novel manner such that the bags are arranged in the small stacks 21 of the desired size on the conveyor and large stacks 20 of the desired size in the buckets automatically as an incident to the driving of the conveyor and the carrier 18. More particularly, the conveyor is driven intermittently from and in timed relation with the bag carrier 11 through a reduction coupling 187 (FIGS. 2 and 4) whereby the conveyor is advanced one step after a predetermined number of steps of the bag carrier, and the carrier 18 is driven from the bag carrier through a second reduction coupling 188 whereby the carrier 18 is advanced one step after a second predetermined numbers of steps of the bag carrier. In this manner, this relatively simple drive arrangement is effective to advance the bags through the entire cycle while, at the same time, counting the bags and arranging the same in the stacks 20 and 21 each containing the desired number of bags.

In the present instance, the bag carrier is coupled to a drive shaft 189 (FIG. 2) which is driven intermittently by a suitable power actuator (not shown) to advance the bags one step toward the conveyor for each revolution. As shown in FIGS. 2 and 4, the shaft 189 is coupled to the camshaft 33 by the reduction coupling 187 which herein effects a four-to-one reduction and may include a sprocket wheel 190 on the shaft 189 driving an endless chain 191 wound around a larger sprocket wheel 192 on a stubshaft 193, the latter being journaled on the frame of the packaging machine 12 (see FIG. 4). Also mounted on and turning with the stubshaft 193 is a smaller sprocket wheel 194 (FIG. 2) driving an endless chain 195 running around a sprocket wheel 197 fast on the adjacent end of the camshaft 33. The wheels are of selected sizes to provide the desired reduction ratio.

With the foregoing arrangement, the camshaft 33 is turned through one revolution for each four revolutions of the shaft 189. In order to advance the conveyor one step after four revolutions of the shaft 189, that is, after four bags have been deposited in the holder dwelling at the loading station, the camshaft is coupled to the conveyor 17 momentarily after the fourth revolution of the shaft 189 by means responsive to the turning of the camshaft 33. Herein, this means includes a cam 198 (FIG. 2) mounted on a stubshaft 199 being turned in unison with the camshaft 33 by sprocket wheels 200 and 201 on the stubshaft 199 and the camshaft, respectively, and connected by an endless chain 202. The cam 198 is formed with a rise portion which engages a follower 203 once during each revolution of the shafts 199 and 33 and actuates a switch 204 on the frame member 28. The switch controls a clutch 205 (FIG. 2) operable when engaged to couple the sprocket shaft 41 to the camshaft 33 through an endless chan 207, sprocket wheels 208 and 209, and appropriate gearing in a gear box 210. A suitable flexible coupling 211 (FIG. 4) may be interposed between the camshaft and the gearing. When the switch 204 is actuated by the cam 198, the camshaft turns the conveyor sprocket 39 to advance the conveyor through one step the length of which is determined by the shape of the cam and the ratio of the gearing. In the present instance, the length of the step corresponds to the center-to-center distance between the holders 43.

The carrier 18 is driven at a further reduced rate from the camshaft 33 through the reduction coupling 188 which herein includes a sprocket wheel 212 on the camshaft driving a larger sprocket wheel 213 on a stubshaft 214 journaled on the frame to turn about a fixed axis and carrying a smaller sprocket wheel 215, shown in phantom in FIG. 2. The sprocket 215 drives a larger sprocket 217 through an endless chain 218, and the sprocket 217 is fast on a shaft 219 which may be coupled to the cartoning machine to operate the various devices for filling and closing the cartons. In the present instance, the sizes of the sprockets 212, 213, 215 and 217 are selected to provide an eight-to-one reduction ratio so that the shaft 219 is turned one revolution for each eight revolutions of the camshaft and each thirty-two revolutions of the packager drive shaft 189.

Means responsive to the turning of the cartoner shaft 219 is provided to couple the carrier 18 to the crankshaft 33 momentarily after the eighth revolution of the camshaft thereby to advance the carrier one step after eight stacks have been inserted in one bucket. Preferably, this means includes a cam 220 (FIG. 2) turning with the cartoner shaft 219 and having a rise portion 221 for engaging a follower 222 once during each revolution to actuate a switch 223, the latter controlling a clutch 224 operable when engaged to couple the camshaft 33 to the sprocket shaft 132 at one end of the carrier 18 through a sprocket wheel 225 on the shaft 132, a second sprocket wheel 227 on a shaft 228 journaled in the gear box 210, and appropriate gearing in the gear box connecting the camshaft to the shaft 228. Accordingly, when the switch is actuated by the cam 220, the camshaft drives the carrier 18 one step to move a filled bucket away from the receiving station and bring an empty bucket into position to receive the small stacks.

I claim as my invention:
1. In a machine for forming generally flat packages and arranging a plurality of said packages in a stack, the combination of, a base, a conveyor on said base for supporting a series of stacks of packages and advancing said stacks successively along a predetermined path between a loading station and a transfer station, a package carrier for delivering packages to said loading station, a power-driven shaft coupled to said package carrier and operable to advance the latter step by step at a predetermined intermittent rate to deliver successive packages to said loading station, a second shaft for driving said conveyor, a first reduction coupling between said shafts whereby said second shaft is driven at a reduced rate, means responsive to the turning of said second shaft and operable to couple the latter to said conveyor once for a first predetermined number of steps of said first shaft thereby to advance the conveyor one step after said first predetermined number of packages have been stacked on said conveyor, a receiver carrier supported on said base, a plurality of receivers spaced along said receiver carrier, the latter being mounted for movement along a predetermined path to present said receivers successively to said transfer station, transfer mechanism at said transfer station for inserting said stacks successively in the one receiver dwelling at said transfer station, said transfer mechanism being driven in timed relation with said conveyor, a third shaft for driving said receiver carrier, a second reduction coupling between said second and third shafts whereby said third shaft is driven at a further reduced rate, and means responsive to the turning of said third shaft and operable to couple the latter to said receiver carrier once for a second predetermined number of steps of said second shaft thereby to advance the receiver carrier one step when said second predetermined number of stacks have been inserted in said one receiver.

2. In a machine for forming generally flat packages and arranging a plurality of said packages in a stack, the combination of, a base, a conveyor on said base for supporting a series of stacks of packages and advancing said stacks successively along a predetermined path between a loading station and a transfer station, a package carrier for delivering packages to said loading station, a power actuator coupled to said package carrier and operable to advance the latter intermittently and step by step to deliver successive packages to said loading station, a first reduction coupling intermittently connecting said actuator to said conveyor to advance the latter one step for a first predetermined number of steps of said package carrier thereby to form a series of stacks of packages on said conveyor, each stack comprising said first predetermined number of packages, a receiver carrier supported on said base, a plurality of receivers spaced along said receiver carrier, the latter being mounted for movement along a predetermined path to present said receivers successively to said transfer station, transfer mechanism at said transfer station for inserting said stacks successively in the one receiver dwelling at the transfer station, mechanism driven from said first reduction coupling and connected to said transfer mechanism to operate the latter in timed relation with said conveyor, and a second reduction coupling driven from said actuator and intermittently connecting the actuator to said receiver carrier to advance the latter one step for a second predetermined number of steps of said package carrier thereby to form a single stack of packages in said one receiver and then present an empty receiver to said transfer station, said single stack comprising said second predetermined number of packages.

References Cited in the file of this patent
UNITED STATES PATENTS

| | | |
|---|---|---|
| 2,047,272 | Kimball et al. | July 14, 1936 |
| 2,272,009 | Keller et al. | Feb. 3, 1942 |
| 2,364,113 | Van Roo | Dec. 5, 1944 |
| 3,013,369 | Wilson et al. | Dec. 19, 1961 |
| 3,046,712 | Carter | July 31, 1962 |

FOREIGN PATENTS

| | | |
|---|---|---|
| 530,027 | Belgium | July 15, 1954 |
| 512,379 | Germany | Nov. 10, 1930 |
| 655,952 | Great Britain | Aug. 8, 1951 |